Figure 1:
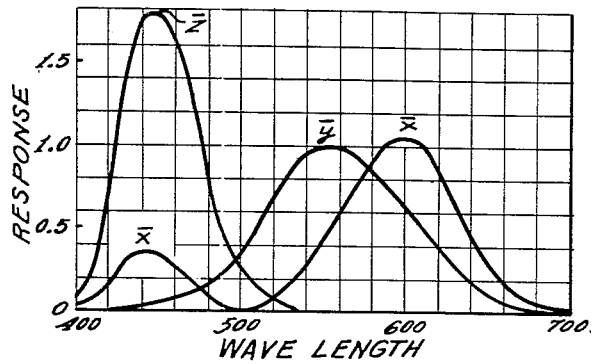

Oct. 18, 1955  G. C. SZIKLAI  2,720,811
TRISTIMULUS PHOTOMETER
Filed Sept. 19, 1950

INVENTOR
George C. Sziklai
BY
Morris D. Palkin
ATTORNEY

United States Patent Office 2,720,811
Patented Oct. 18, 1955

2,720,811

TRISTIMULUS PHOTOMETER

George C. Sziklai, Princeton, N. J., assignor to Radio Corporation of America, a corporation of Delaware Application September 19, 1950, Serial 185,591

6 Claims. (Cl. 88—14)

This invention relates to improvements in photoelectric colorimeters, and particularly to an improved photoelectric colorimeter of the so-called tristimulus type.

At one time, the only known way of comparing colors was by visual observation. Although the human eye theoretically is adapted to distinguish very slight variations in color, it is well known that subjective factors cause different individuals to "see" the same colors differently, and may even cause the same individual to see the same color differently at different times. For this reason, many attempts have been made to develop color measuring instruments with which reproducible color measurements could be made. Of course, with such an instrument available, it would also be possible to "define" any measured or analyzed color by reference to some arbitrary standard, since the measurements obtained with the instrument could be referred directly to the standard.

One instrument that provides an exact analysis of the color of a light is the spectrophotometer, which records the intensity distribution of the light over the whole visible spectrum. The result obtained however is limited in usefulness for two reasons:

1. The color is specified by a large number of coordinates. If the number of these coordinates is reduced, the precision of the color information is reduced as well. It is customary to specify spectrophotometric data in the 400–700 millimicron region with an intensity given at least every 10 millimicrons, thus requiring at least 300 sets of data.

2. Actually two lights having different spectral distributions may look alike. This principle is used extensively in color reproducing processes such as photography, television, etc. For these processes a spectrophotometric curve by itself is not readily suitable for colorimetric matching.

One of the methods that has been devised for specifying a given color in terms of an arbitrary standard is to specify that additive combination of three "primaries" which will reproduce the given color. This method is known as tristimulus specification, and is directly involved in the present invention.

The spectral distribution of the three primaries most universally used for tristimulus color specification is that of the so-called I. C. I. standard observer (see D. B. Judd "The 1931 I. C. I. Standard Observer and Coordinate System for Colorimetry," Journal Optical Society of America, vol. 23, pg. 359–1933). Having analyzed a color to the extent of breaking it down into its spectral distribution, it becomes expedient to further simplify the specification by utilizing two coordinates according to the following relations:

(1) $\quad X = \int R\bar{x}\,d\lambda$ (2) $\quad Y = \int R\bar{y}\,d\lambda$ (3) $\quad Z = \int R\bar{z}\,d\lambda$ (4) $\quad x = \dfrac{X}{X+Y+Z}$ (5) $\quad y = \dfrac{Y}{X+Y+Z}$ where R is the spectral response of the color sample being analyzed, $\bar{x}, \bar{y}, \bar{z}$ are the three distribution factors of the standard I. C. I. observer, and $x$ and $y$ are the desired coordinates. With the specification reduced to two coordinates, the color can be specified on a two-dimensional chart or graph.

In order to avoid the tedious integration procedure indicated by Equations 1–3 above, a proposal was made to construct an instrument having three photocell-filter combinations with responses corresponding to the spectral distribution factors referred to above (see Twyman et al., British Patent 324,351). However, with such instruments as have heretofore been developed in accordance with this proposal, the extent of approximation of the desired response is limited. Particularly, the approximation is seriously limited for the $\bar{x}$ curve which, as will be shown hereinafter, is extremely difficult to simulate with a single photocell-filter combination. The problem of simulation is further complicated when the color source is not a reflector or transmitter so that a special illuminant cannot be used.

It is a general object of the present invention to provide an improved tristimulus photometer for color analysis.

A more specific object of the invention is to provide a simple tristimulus colorimeter in which the spectral distribution factors of the I. C. I. standard observer are closely approximated.

In accordance with the invention, the foregoing and other related objects and advantages are attained by providing means in a tristimulus colorimeter for obtaining the three integrated tristimulus values simultaneously from three combination light filters and photosensitive elements approximating the spectral distribution curves of the I. C. I. standard observer and combining the resultant signals in such a manner as to improve the original approximations. As will be shown, a system of this type is capable of approximating closely the desired overall response.

A more complete understanding of the invention can be had by reference to the following description of an illustrative embodiment thereof, when considered in connection with the accompanying drawing, wherein:

Figure 1 is a graph showing the tristimulus specifications of the various parts of the spectrum according to the I. C. I. standard observer system, Figure 2 is a schematic diagram of a tristimulus photoelectric colorimeter in accordance with the invention, and Figure 3 is a graph showing the spectral response of the apparatus of Figure 2.

As was previously stated, analysis of a color according to the tristimulus specification method requires that one determine the spectral distribution of the energy in that color, and then integrate Equations 1–3, above, with the spectral response information inserted, to allow determination of the coordinate values $x$ and $y$. If one attempts to by-pass the integration step in order to obtain $\bar{x}, \bar{y}$ and $\bar{z}$ directly by using three filter-photocell combinations corresponding to the three curves of the standard observer factors $\bar{x}, \bar{y}$ and $\bar{z}$, one immediately is faced with the difficulty of designing a filter which will duplicate the $\bar{x}$ curve. This can best be seen by reference to Fig. 1, wherein the tristimulus values are plotted against wavelength for the factors $\bar{x}, \bar{y}$ and $\bar{z}$. As shown in Fig. 1, the $\bar{x}$ curve is double looped, having maximum values in the vicinity of 440 and 600 millimicrons, and a minimum value in the vicinity of 500 millimicrons. While it is relatively simple to design a light filter having transmission characteristics which, in combination with the spectral sensitivity of certain photocells, will closely approximate the single loop $\bar{y}$ and $\bar{z}$ curves, the double looped $\bar{x}$ characteristic cannot readily be designed into a filter-photocell combination. However, it is to be noted that the lower wavelength loop in the $\bar{x}$ curve appears somewhat like an attenuated version of the $\bar{z}$ curve. In accordance with the present invention, this relation between the $\bar{x}$ and $\bar{z}$ curves is taken advantage of to provide a relatively simple yet efficient colorimeter.

Figure 2:
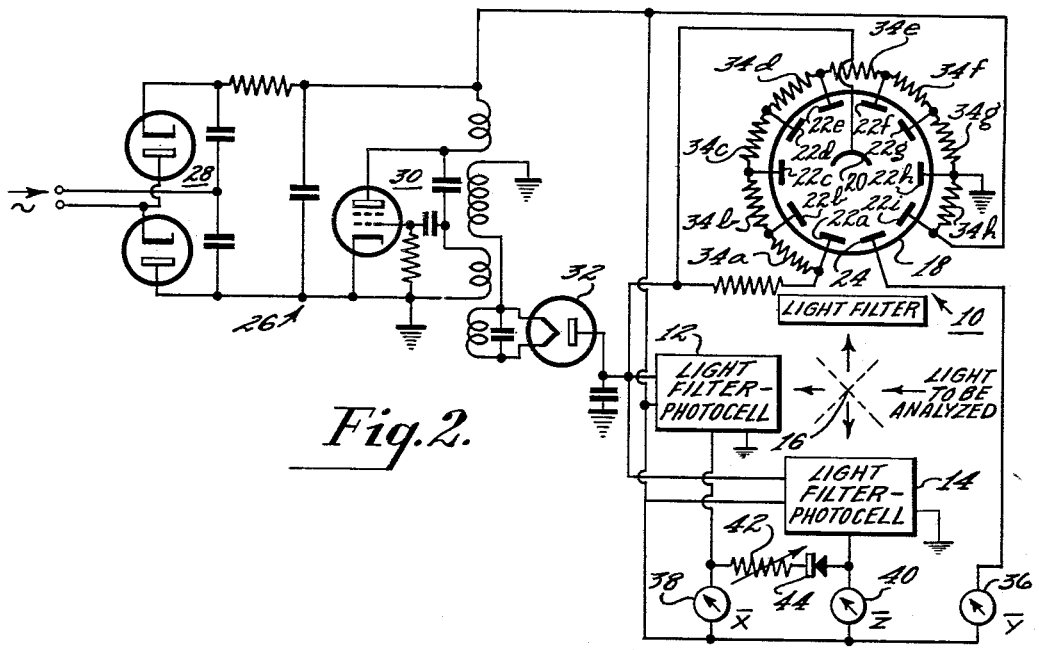
Figure 3:
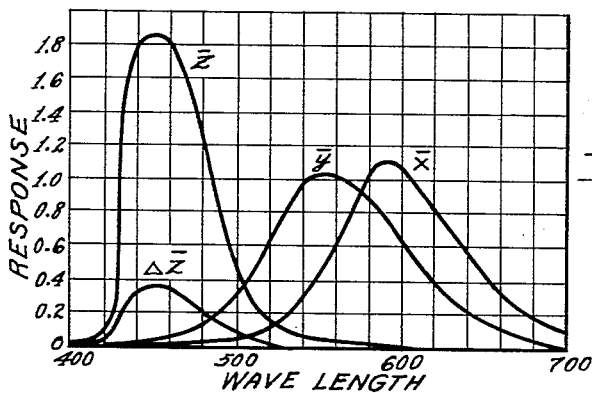

Referring to Fig. 2 of the drawing, a colorimeter arranged in accordance with the invention comprises three photocell-filter combinations 10, 12, 14 arranged to receive light from a color sample to be analyzed (not shown) through a crossed semi-transparent mirror 16. The light reaching the mirror 16 may originate at a source (not shown) and acquire the spectral distribution of the sample either by reflection from the surface thereof or by transmission therethrough. Alternatively, the sample itself may constitute the light source, as in the case of the multicolor fluorescent screens utilized in certain types of color television apparatus. All that is required is a light beam containing the spectral components of the color sample to be analyzed.

Since the photocell-filter combinations 10, 12, 14 in the apparatus are similar in configuration, only one of the combinations, 10, has been shown in detail. The combination 10 preferably includes a photosensitive element 18 of the so-called photomultiplier type, such as a commercial type 1P22 phototube. The photocell 18 comprises a cathode 20, a plurality of secondary electron emitters or dynodes 22a—22i, and an anode 24. As is well known, the cathode 20 is adapted to emit electrons in response to light impinging thereon, and the dynodes 22a—22i are adapted to emit secondary electrons when bombarded with primary electrons. Thus, in the tube 18, when light impinges on the cathode 20, electrons emitted therefrom will bombard the first dynode 22a. Secondary electrons will leave the first dynode 22a in an amount exceeding the number of bombarding primary electrons, and will strike the second dynode 22b. This effect will continue cumulatively through the succeeding dynodes 22c—22i, so that a relatively large current will flow to the anode 24 for a small current from the cathode 20.

Dynode and anode voltages for the tube 18 preferably are provided by a radio frequency oscillator power supply 26. The power supply 26 includes a voltage doubler-rectifier section 28 for converting alternating voltage from the usual commercial supply (not shown) to unidirectional voltage for energizing an oscillator section 30. Radio frequency voltage developed in the oscillator section 30 will be converted to negative polarity unidirectional voltage by a half-wave rectifier 32. The cathode 20 and the first seven dynodes 22a—22g of the multiplier 18 are connected to the rectifier 32 through a circuit which includes voltage divider resistors 34a—34g. The eighth dynode 22h is grounded, and the ninth dynode 22i and anode 24 are connected to the positive side of the voltage doubler circuit 28. Since the power supply 26 is conventional, it is believed that detailed description of the operation thereof is unnecessary.

The anode circuits for the photocells in the combinations 10, 12, 14 include measuring device such as microammeters 36, 38, 40, or the like. These measuring devices provide an indication of the current flowing in the photocell circuits, as will be described hereinafter.

Each of the photocell-filter combinations 10, 12, 14 is selected to have a spectral response corresponding as closely as possible to the spectral response curve of one of the $\bar{x}$, $\bar{y}$, $\bar{z}$ factors of Fig. 1. Throughout this description the term "photocell-filter combination" has been used for the reason that the spectral response of any given photo-tube, selected at random, may differ somewhat from that of another tube of the same type. This simply means that although the filters themselves can be designed to have a spectral characteristic approximating one of the curves of Fig. 1, or a portion thereof, the results obtained when such filters are utilized with photocells must take into account the spectral response of the photocell. The filter-photocell combinations, together with their measuring devices, constitute separate signal channels for the $\bar{x}$, $\bar{y}$, and $\bar{z}$ components of the color being analyzed.

Assume, then, that one has selected photocell-filter combinations having characteristics similar to the curves for the factors $\bar{y}$ and $\bar{z}$ of Fig. 1. These may, for example, be the combinations 10, 14 of Fig. 2. As previously stated, it is practically impossible to obtain a photocell-filter combination with the double loop characteristic of the $\bar{x}$ factor in Fig. 1. However, a combination can be obtained which will satisfactorily cover the $\bar{x}$ factor for the region between 500 and 700 millimicrons. Assuming, then, that the combination 12 of Fig. 2 has such a spectral response characteristic (i. e. corresponding to the $\bar{x}$ curve of Fig. 1 between 500 and 700 millimicrons), the lower frequency loop in the $\bar{x}$ curve is obtained, in accordance with the invention, by providing a cross-feed circuit between the output circuits of the combinations (12 and 14) which cover the $\bar{x}$ and $\bar{z}$ curves. To provide the necessary attenuation, a variable resistor 42 or other comparable attenuator may be included in the cross-feed path. Also, some provision should be made to ensure that there will be feed through only from the $\bar{z}$ channel to the $\bar{x}$ channel, and not in the other direction. For example, the cross-feed circuit may include a crystal rectifier element 44 which will only permit current flowing in the $\bar{z}$ channel to reach the meter in the $\bar{x}$ channel, and not vice-versa.

When the apparatus of Fig. 2 is in operation, colored light from the sample being tested will be directed toward each of the filter-photocell combinations 10, 12, 14. If the colored light sample has components falling within the response characteristic of one or more of the combinations 10, 12, 14, then the measuring device in the channel involved will provide an indication of the integrated value of the light within the limits of that channel. Also, if the light sample has components within the wavelength limits of the $\bar{z}$ channel, then the output of the $\bar{x}$ channel will include both $\bar{x}$ and attenuated $\bar{z}$ components.

The output signals may be applied to meters of the proper sensitivity, and from the readings, the I. C. I. coordinates can be computed easily by dividing X and Y with the sum of the three readings.

Another application of the device may be the use of two instruments, connected to three zero center meters. One of the instruments then can be aimed at the original subject, the other at a reproducing device. A zero indication on the three meters then would correspond to a perfect match for the standard observer, while positive or negative indications would provide a sense and magnitude of the corrections required. For example, in a color television studio, one of the instruments might be set up to survey a scene being televised, and the other instrument set up facing a monitor receiver on which the televised picture is displayed. Any departure from zero reading on any of the three zero center meters would indicate the necessary adjustments to be made at the television camera for proper color reproduction.

Since many changes could be made in the specific apparatus shown and described, all within the scope and spirit of the invention, the foregoing is to be construed as illustrative, and not in a limiting sense.

What is claimed is:

1. In apparatus for analyzing the color of light, in combination, a plurality of light filters each having a different light transmission characteristic, each of said characteristics approximating at least a major portion of a different one of the spectral distribution curves, respectively, of the standard primary colors defined by the International Commission On Illumination, a photosensitive element associated with each said filter and responsive to light passing through the filter associated therewith, each said element being connected in an electric circuit to control the current in each said circuit as a function of the light reaching the element in that circuit, measuring means connected to each said circuit to measure the effects of said elements on said currents, and unidirectionally conductive means connecting only one of said circuits to only one other of said circuits to furnish to said other circuit a current proportional to the current in said one circuit.

2. A tristimulus photometer comprising first, second and third light filters having different light transmission characteristics, each of said characteristics approximating at least a major portion of a different one of the spectral distribution curves, respectively, of the standard primary colors defined by the International Commission On Illumination, a plurality of photomultiplier tubes each associated with a separate one of said filters and responsive to light passing through said filters for generating an electric current proportional to the light received by said tubes through said filters, means to direct light to be analyzed to said tubes through said filters, a plurality of circuits each connected to a separate one of said tubes to conduct the currents generated by said tubes, measuring means connected in each said circuit to measure said currents, and an auxiliary circuit including a unidirectionally conductive element connecting two of said tube circuits to transfer current from one to the other of said two circuits in an amount proportional to the current flowing in said one circuit.

3. Apparatus as defined in claim 2 wherein said auxiliary circuit comprises a serially connected rectifier and variable resistor.

4. In a photometer apparatus of the type wherein light to be analyzed is segregated into three spectral components and converted by photocell-light filter combinations having different spectral responses to electric currents in circuits connected to said photocells, said responses approximating the spectral distribution curves $\bar{y}$, $\bar{z}$, and the major lobe of the curve $\bar{x}$ of the standard primary colors defined by the International Commission On Illumination, and wherein means are connected to said circuits to measure said three currents as a measure of said three spectral components, the improvement which comprises a single unidirectionally conductive circuit connecting the $\bar{z}$ spectral component measuring circuit to the $\bar{x}$ spectral component measuring circuit to provide in the last named circuit a current proportional to the current in said $\bar{z}$ spectral component circuit.

5. In apparatus for analyzing the color of light, in combination, a plurality of light filters each having a different light transmission characteristic, a majority of said characteristics approximating a majority of the spectral distribution curves, respectively, of the standard primary colors defined by the International Commission On Illumination, and a minority of said characteristics approximating a major portion of the remaining spectral distribution curves, respectively, of said primary colors defined by said Commission, a photosensitive element associated with each said filter and responsive to light passing through the filter associated therewith, each said element being connected in an electric circuit to control the current in each said circuit, as a function of the light reaching the element in that circuit, measuring means connected to each said circuit to measure the effects of said elements on said currents, and unidirectionally conductive means connecting only one of said circuits to only one other of said circuits to furnish to said other circuit a current proportional to the current in said one circuit.

6. A tristimulus photometer comprising first, second and third light filters having different light transmission characteristics, two of said characteristics approximating the $\bar{y}$ and $\bar{z}$ spectral distribution curves, respectively, of the standard primary colors defined by the International Commission On Illumination, the third characteristic approximating the major lobe of the two-lobed $\bar{x}$ spectral distribution curve of said primary colors defined by said Commission, photomultiplier tubes associated one with each said filter and responsive to light passing through said filters for generating an electric current proportional to the light received by said tubes through said filters, means to direct light to be analyzed to said tubes through said filters, circuits connected one to each said tube to conduct the currents generated by said tubes, measuring means connected in each said circuit to measure said currents, and an auxiliary circuit including a unidirectionally conductive element connecting only two of said tube circuits to transfer current from one to the other of said two circuits in an amount proportional to the current flowing in said one circuit, said one circuit comprising the tube associated with the filter having the $\bar{z}$ characteristic, and said other of said two circuits comprising the tube associated with the filter having the $\bar{x}$ characteristic.

References Cited in the file of this patent

UNITED STATES PATENTS

| | | |
|---|---|---|
| 2,413,706 | Gunderson | Jan. 7, 1947 |
| 2,483,452 | Berkley | Oct. 4, 1949 |

FOREIGN PATENTS

| | | |
|---|---|---|
| 324,351 | Great Britain | Jan. 20, 1930 |
| 687,405 | Germany | Jan. 29, 1940 |